(12) United States Patent
Laake

(10) Patent No.: US 6,462,280 B2
(45) Date of Patent: Oct. 8, 2002

(54) SYSTEM AND METHOD FOR SPLICING CABLES

(76) Inventor: Jimmy L. Laake, P.O. Box 666, Smithville, TX (US) 78957

( * ) Notice: Subject to any disclaimer, the term of this patent is extended or adjusted under 35 U.S.C. 154(b) by 0 days.

(21) Appl. No.: 09/866,380

(22) Filed: May 24, 2001

(65) Prior Publication Data

US 2002/0056566 A1 May 16, 2002

Related U.S. Application Data

(60) Provisional application No. 60/206,667, filed on May 24, 2000.

(51) Int. Cl.[7] .............................................. H02G 15/08
(52) U.S. Cl. ..................................................... 174/88 R
(58) Field of Search ................................ 174/88 R, 76, 174/106 R; 385/110

(56) References Cited

U.S. PATENT DOCUMENTS 5,183,966 A  *  2/1993  Hurtado et al. ................ 174/19
6,218,618 B1 *  4/2001  O'Neill et al. ................. 174/76

FOREIGN PATENT DOCUMENTS

JP          53-26981    *   3/1978
JP          4-87511     *   3/1992

* cited by examiner

Primary Examiner—Chau N. Nguyen
(74) Attorney, Agent, or Firm—Gray Cary Ware & Freidenrich

(57) ABSTRACT

Cable splices and methods for splicing cables wherein two segments of cable, each of which includes a central conduit, a plurality of electrical wires and a plurality of supporting wires are joined together. In one embodiment, the cable segments are coupled by cleanly cutting the ends of the two cable segments to prepare them to be spliced, folding back the wires and joining the conduits of the two cables, then connecting each of the electrical wires of one segment to a corresponding wire of the other segment, then connecting each of the support wires of the two cable segments to a support structure which surrounds the conduit and electrical wires, and finally placing a mold over the spliced area and filling the mold with a protective material which will harden and thereby strengthen the splice and protect the embedded conduit and wires.

7 Claims, 6 Drawing Sheets

SYSTEM AND METHOD FOR SPLICING CABLES

RELATED APPLICATIONS

This application claims the benefit of U.S. provisional application Ser. No. 60/206,667, filed on May 24, 2000 entitled "System and Method for Splicing Cables"

FIELD OF THE INVENTION

The invention relates generally to equipment used in oil exploration and more particularly to a system and method for repairing certain types of cables used in oil exploration and related industries by splicing together to undamaged sections of cable.

BACKGROUND OF THE INVENTION

Production of oil and other hydrocarbon resources involves not only drilling wells to retrieve these resources, but also surveying potential productive fields to determine where wells should be drilled. Seismic surveys provided one means for determining whether or not a particular field contains hydrocarbon reserves. Equipment has been developed to conduct seismic surveys both on land and in offshore environments.

One type of equipment which is used in offshore seismic surveys uses pneumatic guns to generate shockwaves which are propagated through the water to the ocean floor and then through the underlying geological structure. The reflections of these shockwaves are then measured and analyzed to determine whether the geological structure below the ocean floor contains hydrocarbon reserves.

The pneumatic guns which are used in this type of offshore seismic survey are connected to a cable which is towed by a surface ship. The cable has an air line for providing compressed. air to the pneumatic guns, as well as a number of electrical wires for controlling the operation of the guns and returning collected data to the surface ship. Typically, several of the pneumatic guns are connected to a single cable. A single ship may tow several cables, each of which has a number of pneumatic guns connected to it.

Referring to FIG. 1, a cutaway view of a cable which is typical of those used in this field is shown. Cable 10 has a central conduit, or air line, 12 through which compressed air it is provided to the pneumatic guns. Conduit 12 is surrounded by a plurality of electrical wires 14. These wires are normally individual insulated wires, although other types of wires may be used. A protective sheath 16 surrounds electrical wires 14 to provide protection from wear which might cause short-circuits or other electrical problems. Sheath 16 is surrounded by a plurality of spring steel wires 18. In contrast to electrical wires 14, steel wires 18 are used to strengthen the cable, which in normally used must withstand several thousand pounds of tensile stress. Finally, an outer protective cover 20 encloses spring steel wires 18. A typical cable has a diameter of approximately 2.5 inches (6.35 cm).

As mentioned above, these cables are used to two pneumatic guns behind seismic survey ships. The cables are subjected to the harsh conditions of marine environments and, as result, will experience wear simply from normally used. Additionally, the cables may encounter obstacles such as fishing nets or debris which cause further wear. Still further, the cables may be kinked when they are reeled onto the ship or may be otherwise misused by the operators of the ship. Due to this wear and tear, cables may suffer damage (e.g., cut electrical lines or leaks in the air line) which renders them unusable.

The cables described above are quite expensive. It is not unusual for a single cable to cost in excess of $100,000. Despite the cost of these cables, however, damaged cables are typically replaced rather than repaired because there are no adequate means in the prior art to perform the repairs. It would therefore be desirable to provide a system and/or method for repairing damaged cables and thereby saving the cost of having to purchase a replacement cable.

BRIEF DESCRIPTION OF THE DRAWINGS

Other objects and advantages of the invention may become apparent upon reading the following detailed description and upon reference to the accompanying drawings in which.

Figure 1:
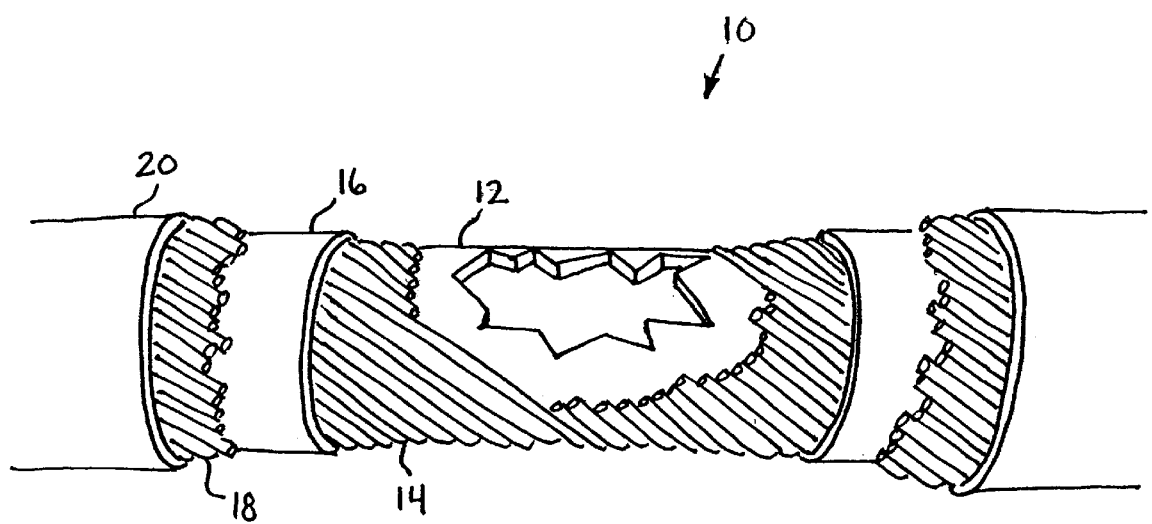
FIG. 1 is a cutaway view of a cable which is typical of those used with seismic survey equipment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises cable splices, as well as methods for splicing cables, in accordance with this disclosure. In one embodiment, two segments of cable, each of which includes a central conduit, a plurality of electrical wires and a plurality of supporting wires are joined together. The cable segments are coupled using a method that comprises cleanly cutting the ends of the two cable segments to prepare them to be spliced, folding back the wires and joining the conduits of the two cables, then connecting each of the electrical wires of one segment to a corresponding wire of the other segment, then connecting each of the support wires of the two cable segments to a support structure which surrounds the conduit and electrical wires, and finally placing a mold over the spliced area and filling the mold with a protective material which will harden and thereby strengthen the splice and protect the embedded conduit and wires.

Referring again to FIG. 1, a damaged area of a cable is shown. The following description of the preferred embodiment will be directed to the repair of this particular type of cable. It should be noted that, while this particular cable includes a central conduit 12, the method may also be used to repair other types of cables which have somewhat different structures. For example, the cable may not have a central conduit, but may instead only have electrical wires 14 and support wires 18. Likewise, the method is not limited to the repair of single, damaged cables, but may also be used to splice together separate cables, as long as they have similar structures (e.g., both have conduits, both have the same number of electrical wires, etc.)

Figure 2:
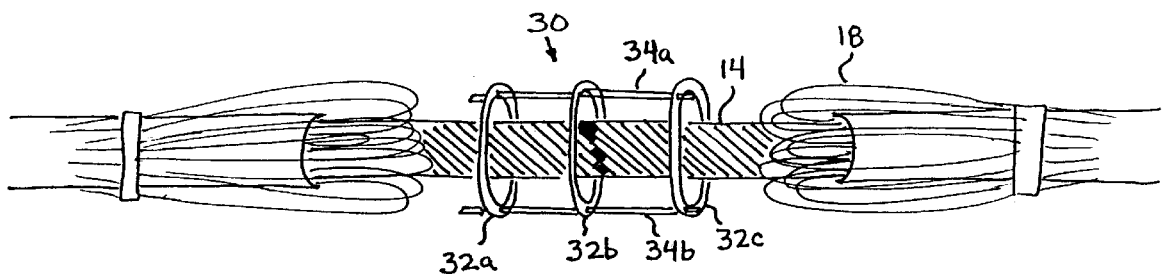
FIG. 2 is an illustration of a partially completed splice in one embodiment, wherein the central conduit and electrical wires have been reconnected and the wiring frame positioned over the reconnected wired, but wherein the support wires have not yet been connected to the wiring frame.

The first step in the method is to prepare the cable to be prepared. Since, in this case, the cable has a damaged area which needs to be repaired, preparation of the cable consists of cutting the cable on each side of the damaged area so that there are two clean ends which can be joined together. After the ends are cut, approximately 18 inches of the outer protective cover 20 of each cable is stripped to expose spring steel support wires 18. Spring steel support wires 18 are then pulled back away from the end of the cable and secured. (Support wires 18 may be secured in this position simply by wrapping tape or elastic bands around the ends of the wires as shown in FIG. 2.) After support wires 18 are folded back out of the way, protective sheath 16 is stripped and electrical wires 14 are also folded back away from conduit 12. Typically, there is no need to secure the electrical wires in this position. The bare end of the conduit of each cable segment is now exposed.

In one embodiment, before the conduits and electrical wires of the two cable segments are joined, three rings are placed over one of the cables. These rings will be used to connect the support wires of the two cable segments, as will be explained in more detail below.

Conduit 12 is repaired by installing half of a coupling on each of the conduit ends and then assembling the coupling. In one embodiment, a standard JIC fitting is used to couple the ends of the conduit. The installation of this type of fitting is well-known in the art and will not be explained in more detail here. It should be noted that, in other embodiments, any other suitable method for coupling the conduit ends may be used. After the coupling is installed and connected, rubber tape is wrapped around the coupling to provide a protective layer between the coupling and the electrical wires which will be positioned adjacent to the coupling in order to prevent wear and possible damage to the wires.

The next step in the process is to reconnect each of the electrical wires of one cable segment to the corresponding wires of the other cable segment. In one embodiment, this is performed by simply stripping the end of each wire, wrapping the bare ends of corresponding wires together and soldering the wires. In a preferred embodiment, shrink-wrap tubing is placed on each set of wires before they are connected to each other. After the wires are joined and soldered, the shrink-wrap tubing is positioned over the soldered connection and heated to shrink the tubing and secure the tubing over the connection. Each of the electrical wires is connected to a corresponding wire in this manner.

After the conduits and electrical wires of each of the cable segments have been reconnected, the support wires of each of the cable segments must be connected. In this embodiment, the support wires of the two cable segments are not connected directly to each other, but are instead connected to a rigid structure which is positioned around the conduits and electrical wires. This structure will be referred to herein as a wiring frame. Referring to FIG. 2, a suitable wiring frame is shown installed over the spliced portion of the cable(s).

As shown in FIG. 2, wiring frame 30 comprises three rings 32 which are connected to each other by means of several threaded rods 34. Rods 34 serve not only to connect rings 32, but also to keep them evenly spaced from each other. In this embodiment, rings 32 are copper, while threaded rods 34 are stainless-steel. It should be noted that the choice of these materials is not important to the invention and that, in other embodiments, other materials may be used. As mentioned above, the rings used in this embodiment are placed on one (or both) of the cable segments prior to reconnecting the central conduit and electrical wires. In other embodiments, the conduit and electrical wires may be connected first, then the wiring frame may be assembled around the splice using, for example, half-rings which are connected to form full rings around the splice. Various other configurations may also be used.

It should be noted that, for the purposes of this disclosure, identical items in the figures may be indicated by identical reference numerals followed by a lowercase letter, e.g., 32a, 32b, and so on. The items may be collectively referred to herein simply by the reference numeral.

Figure 3:
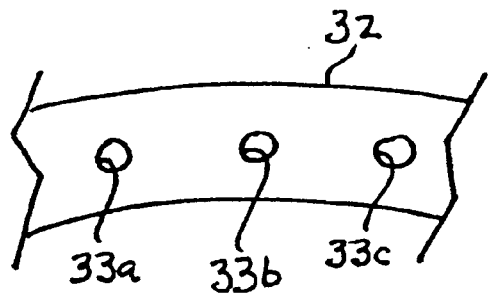
FIG. 3 is a partial section of one of rings which comprises part of the wiring frame in one embodiment.

Referring to FIG. 3, a partial section of one of rings 32 is shown. Each of rings 32 has a plurality of holes 33 therethrough. Holes 33 are generally evenly spaced around the circumference of the rings. Holes 33 are used to connect support wires 18 to rings 32 while keeping the wires spaced around the rings.

Figure 4:
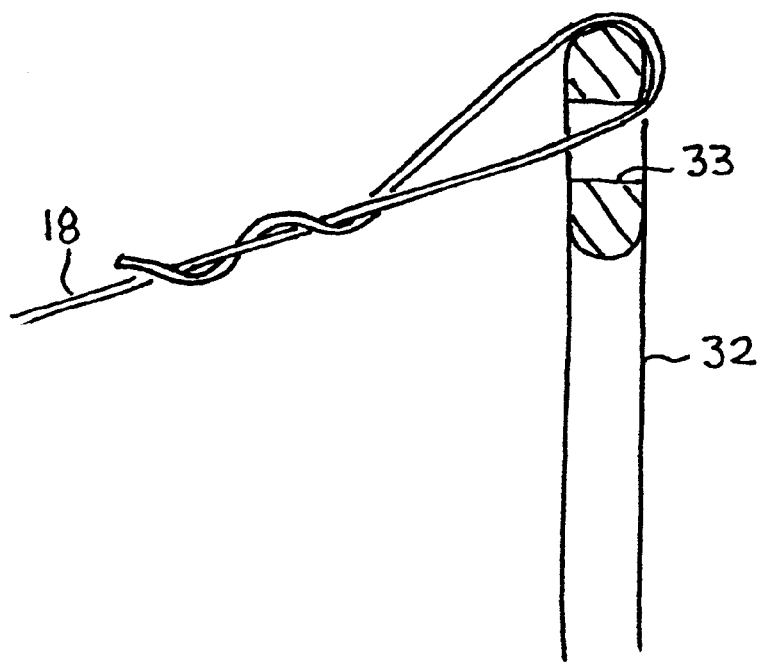
FIG. 4 is a detailed view illustrating the manner in which a support wire is connected to one of the rings of the wiring frame in one embodiment.

Referring to FIG. 4, a detailed view illustrating the manner in which a support wire is connected to one of the rings is shown. As can be seen in this figure, wire 18 is passed through one of the holes 33 in ring 32. The wire 18 is then folded back over ring 32 and it is wrapped around itself. It should be noted that, while support wires 18 are connected to the wiring frame in this manner, other embodiments may use other means to secure the wires.

Figure 5:
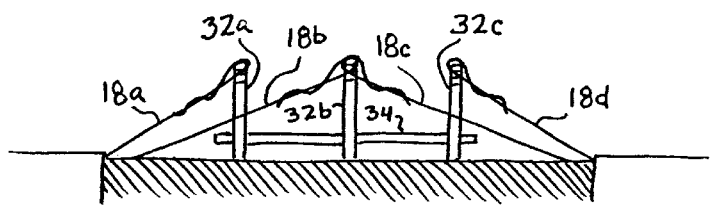
FIG. 5 is a diagram illustrating the manner in which support wires of opposing cable segments are connected to the rings of the wiring frame in one embodiment.

Referring to FIG. 5, a diagram illustrating the manner in which support wires 18 are connected to rings 32 is shown. It should be noted that, in this embodiment, support wires 18 comprise two layers of wires. The wires of an inner layer are connected to center ring 32b, while the wires of an outer layer are connected to rings 32a and 32c.

The support wires of the inner layer are connected to center ring 32b before the support wires of the outer layer are connected to the other rings. First, one of the inner support wires 18b from a first one of the cable segments is connected to center ring 32b as shown in FIG. 4. Wire 18b is threaded through a first hole in center ring 32b. Then, a corresponding wire 18c from the other cable segment is threaded through the same hole in center ring 32b and secured by wrapping the wire back around itself. Next, a wire is selected from the opposite side of one of the cable segments and is attached to center ring 32b. This wire is threaded through a second hole which is on the opposite side of center ring 32b from the first hole. A corresponding wire from the other cable segment (which is also on the opposite side of the cables) is also threaded through the second hole and wrapped back around itself. The four wires which are attached to center ring 32b hold the ring generally in position at the center of the splice.

This process is then repeated at locations midway between the already attached wires. Eventually, each of the wires of the inner layers of the cable segments is attached to center ring 32b. The wires of the outer layers of the cable segments are each attached to one of the outer rings 32a and 32c. In this instance, however, only the wires of one of the cable segments are attached to a particular one of the rings. For example, as illustrated in FIG. 5, support wires from the cable segment on the left are attached to ring 32a, while support wires from the cable segment on the right are attached to ring 32c. Rings 32a and 32c remain in position when support wires 18 are attached because these rings are connected to center ring 32b by threaded rods 34.

After all of support wires 18 have been connected to wiring frame 30 as described above, a mold is placed around the splice. The mold encompasses all of the exposed wires (both electrical and support wires,) as well as wiring frame 30. The mold is sealed, except for a set of holes which are used to fill the mold.

Figure 6:
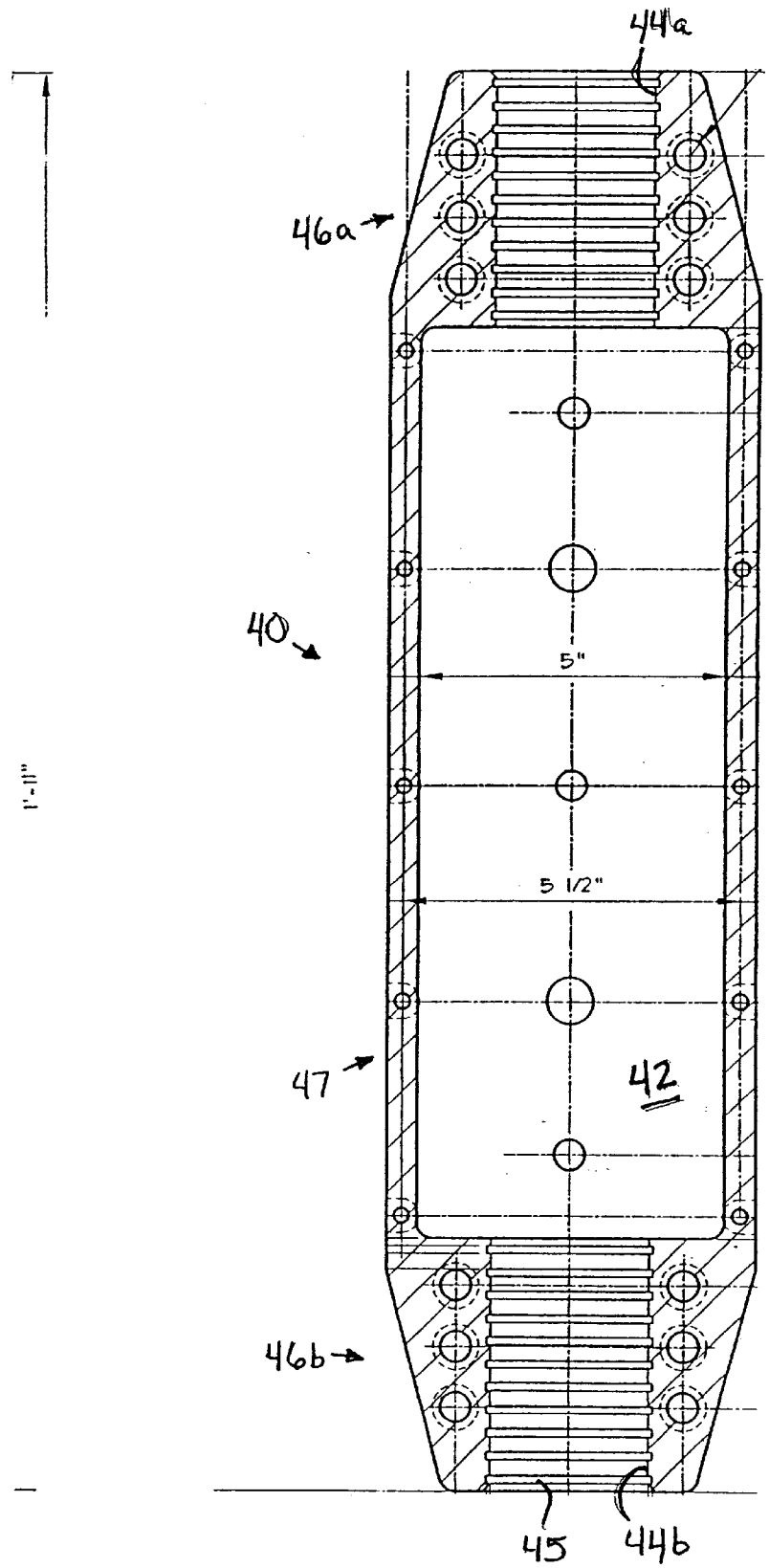
FIG. 6 is one half of the mold/protective cover used in one embodiment.

Referring to FIG. 6, the design of a mold as used in one embodiment is shown. The mold 40 comprises a central cavity 42 which has a sufficiently large diameter to accommodate wiring frame 30 and is sufficiently long to encompass the exposed portions of the cables. Mold 40 has two essentially identical halves which are configured to be bolted together around the splice in the cables. The assembled mold has apertures at each end (44a and 44b) to accommodate the cables which extend outward from the splice. As shown in this figure, apertures 44a and 44b have grooves 45 machined into the aperture walls to allow them to grip the cable segments.

When mold 40 is assembled around the splice, a protective material such as a fiberglass resin is poured into the mold. When mold 40 is filled with the fiberglass resin, the resin fills all the open spaces within the mold. The fill holes are then plugged and the fiberglass resin is allowed to cure. When the fiberglass resin hardens, it serves both to form a shell which protects the spliced area from impact damage and to immobilize the support wires which increases the tensile strength of the spliced cable. It should be noted that, although fiberglass resin is used in this embodiment, other embodiments may use other materials which harden to form a protective shell around the splice. For example, other embodiments may use different materials (e.g., rigid or semi-rigid foams, composites or epoxies.)

In one embodiment, mold 40 serves another purpose. If mold 40 is not removed from the splice after the molded material (e.g., fiberglass resin) hardens, it can serve as another protective shell. This is particularly useful if the molded material is vulnerable to impact damage. For instance, because the matrix of a hardened fiberglass resin can be shattered if it is impacted, the splice will have a substantially longer useful life if it is protected from such impacts. Consequently, in one embodiment, mold 40 is manufactured from stainless-steel and is left in place over the splice after the molded material within the mold hardens. In this embodiment, mold 40 is manufactured by machining two end pieces 46a and 46b and welding these end pieces onto a stainless-steel to tube 47. Prior to welding the pieces together, end pieces 46 have apertures 44 and grooves 45, as well as a plurality of bolt holes, machined therein. Tube 47 has a plurality of filler holes machined therein. After end pieces 46 are welded to tube 47, the assembly is sawn in half to form the opposing pieces of the mold.

Figure 7:
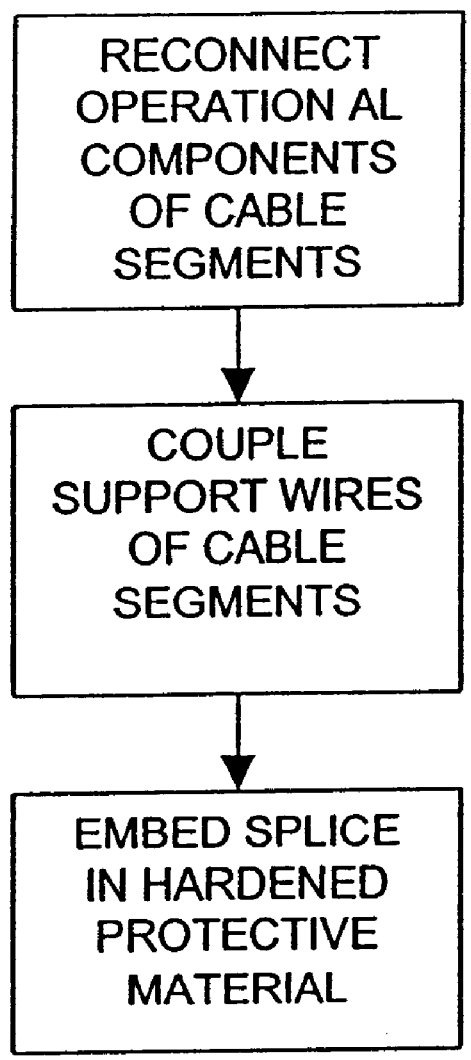
FIG. 7 is a flow diagram illustrating the steps for splicing cables in a basic embodiment.

Referring to FIG. 7, a flow diagram illustrating the steps for splicing cables in a basic embodiment is shown. The procedure includes the basic steps of reconnecting the operational components of the cable segments (e.g., the central conduit and electrical wires,) coupling the support wires of the cable segments (e.g., by connecting them to a wiring frame,) and then embedding the resulting splice in a hardened protective material.

Figure 8:
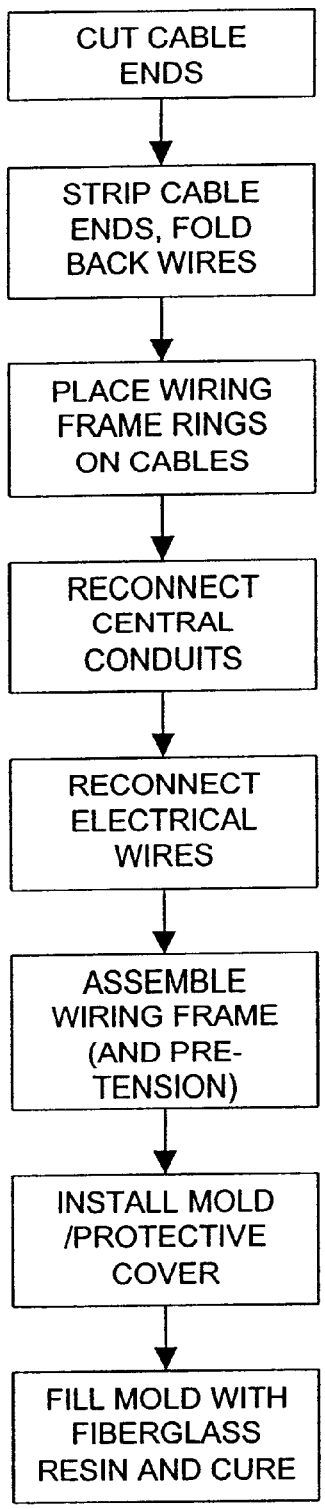
FIG. 8 is a more detailed flow diagram illustrating the steps for splicing cables in a preferred embodiment.

Referring to FIG. 8, a flow diagram illustrating the steps for splicing cables as described in detail above is shown. In this embodiment, the cable segment ends are cleanly cut, the ends are stripped and the wires folded back, the wiring frame rings are placed around the cable segments, the central conduit is reconnected, the electrical wires are reconnected, the wiring frame is assembled and positioned, the support wires are connected to the wiring frame (and pretensioned,) the mold/protective cover is installed over the splice, and fiberglass resin is poured into the mold and cured.

As indicated above, the procedure for splicing the cable segments may vary for different types of cables. For example, if the cables have electrical wires, but no central conduit, then, obviously, it will not be necessary to reconnect conduits between the cable segments. Similarly, if the cables include components other than a central conduit (e.g., hydraulic lines or encased mechanical linkages,) these components can be reconnected and the remainder of the procedure carried out. The procedure may also vary in other details. For example, while the support wires in the embodiment described above are connected to a wiring frame, other embodiments may connect the support wires directly to each other. If a wiring frame is used, the frame may have a configuration which differs from the three-ring structure described above, or the support wires may be attached to the frame in a manner other than being threaded through holes in the rings, folded back and wrapped around themselves.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for splicing a first cable segment to a second cable segment, wherein the cable segments each comprise a center conduit, a plurality of electrical wires, and a plurality of support wires, the method comprising:
   coupling the center conduit of the first cable segment to the center conduit of the second cable segment;
   coupling each of the electrical wires of the first cable segment to corresponding electrical wires of the second cable segment;
   installing a wiring frame around the coupled electrical wires;
   connecting each of the support wires of the first cable segment to the wiring frame;
   connecting each of the support wires of the second cable segment to the wiring frame;
   installing a mold over the cable segments, wherein the mold encompasses the wiring frame and the support wires;
   filling the mold with a filler material;
   curing the filler material to form a protective shell in which the wiring frame and the support wires are embedded and in which the center conduit and electrical wires are encased.

2. A cable splice between a first cable segment and a second cable segment, wherein the cable segments each comprise a center conduit, a plurality of electrical wires, and a plurality of support wires, the splice being manufactured by the method comprising:

coupling the center conduit of the first cable segment to the center conduit of the second cable segment;

coupling each of the electrical wires of the first cable segment to corresponding electrical wires of the second cable segment;

installing a wiring frame around the coupled electrical wires;

connecting each of the support wires of the first cable segment to the wiring frame;

connecting each of the support wires of the second cable segment to the wiring frame;

installing a mold over the cable segments, wherein the mold encompasses the wiring frame and the support wires;

filling the mold with a filler material;

curing the filler material to form a protective shell in which the wiring frame and the support wires are embedded and in which the center conduit and electrical wires are encased.

3. A splice between a first cable segment and a second cable segment, wherein the cable segments each comprise a center conduit, a plurality of electrical wires, and a plurality of support wires, the splice comprising:

a coupling connecting the center conduit of the first cable segment to the center conduit of the second cable segment;

a plurality of electrical connections between each of the electrical wires of the first cable segment and a corresponding electrical wire of the second cable segment;

a wiring frame positioned around the center conduit and the electrical wires;

a plurality of support wires of the first cable segment connected to the wiring frame;

a plurality of support wires of the second cable segment connected to the wiring frame;

wherein the support wires are embedded in a hardened protective material.

4. The splice of claim 3, further comprising a protective cover positioned over the hardened protective material.

5. The splice of claim 4, wherein the protective cover forms a mold and wherein the hardened protective material is formed by pouring a liquid material into the mold and curing the liquid material to a hardened state.

6. The splice of claim 3, wherein the hardened protective material comprises fiberglass resin.

7. The splice of claim 3, wherein the hardened protective material comprises epoxy.

* * * * *